United States Patent [19]

Berkin et al.

[11] Patent Number: 4,823,394
[45] Date of Patent: Apr. 18, 1989

[54] PATTERN RECOGNITION SYSTEM

[75] Inventors: George Berkin, Yardley; Richard F. Heady, Jenkintown; Jeffrey Clarke, Telford, all of Pa.; Asuri Raghavan, Bedminster, N.J.; Raymond Foran, Philadelphia, Pa.; Ralph Mayer, Ambler, Pa.; Joseph Chlebda, Langhorne, Pa.

[73] Assignee: Kulicke & Soffa Industries, Inc., Willow Grove, Pa.

[21] Appl. No.: 855,760

[22] Filed: Apr. 24, 1986

[51] Int. Cl.$^4$ ............................................. G06K 9/48
[52] U.S. Cl. ......................................... 382/8; 382/22; 358/107
[58] Field of Search .................... 382/8, 22, 18, 51; 358/107; 356/376; 235/454, 483, 486

[56] References Cited

U.S. PATENT DOCUMENTS

| | | | |
|---|---|---|---|
| 3,370,157 | 2/1968 | Lockey | 235/483 |
| 3,646,325 | 2/1972 | George | 235/483 |
| 4,238,780 | 12/1980 | Doemens | 382/22 |
| 4,400,728 | 8/1983 | Long | 358/107 |
| 4,424,588 | 1/1984 | Sath et al. | 358/107 |
| 4,497,066 | 1/1985 | Gasparri, Jr. | 358/107 |
| 4,680,807 | 7/1987 | Stockburger et al. | 235/486 |
| 4,687,107 | 8/1987 | Brown et al. | 358/107 |

Primary Examiner—Leo H. Boudreau
Assistant Examiner—Donald J. Daley
Attorney, Agent, or Firm—Woodcock Washburn Kurtz Mackiewicz & Norris

[57] ABSTRACT

A system and method for determining the condition and location of an electronic die on a die holding means is disclosed. The system includes means for illuminating the die and means for generating a video image in which the appearance of the die is enhanced relative to the die holding means. This is accomplished by providing a sensing means for sensing primarily only that light reflected from the candidate die. Means for converting the video image into a digital image and processing said digital image to identify the edges of the die is also disclosed. More particularly, means for generating digital data representing the video image, means for defining a corridor in said digital image, said corridor having a width and a length, and means for processing the digital image to obtain a signature element within the digital data are provided. A signature element is the widthwise summation of data within the corridor at a point along the lengthy of the corridor and represents the relative blackness or whiteness in a particular region of the digital image. Also provided are control means for defining a corral within the digitized image of the die, means for obtaining a black count within the corral, and means for analyzing the black count to determine the condition of the die. Means for automatically selecting the light intensity and gray level used in generating the digital image is provided.

19 Claims, 12 Drawing Sheets

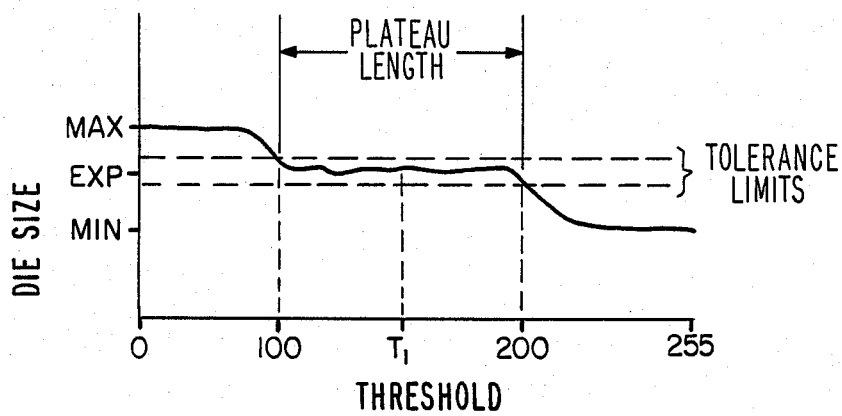
_Fig. 9c_
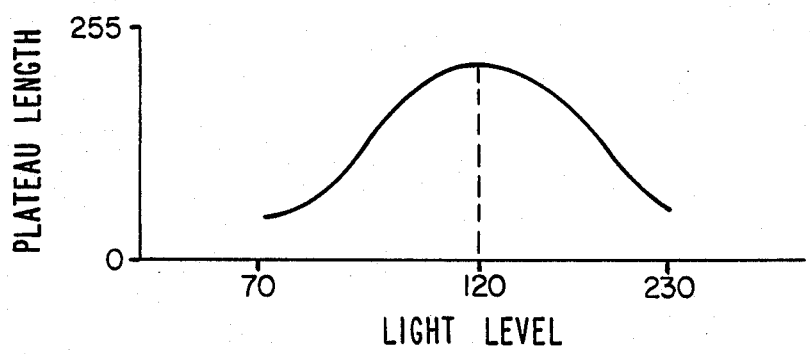
_Fig. 9d_
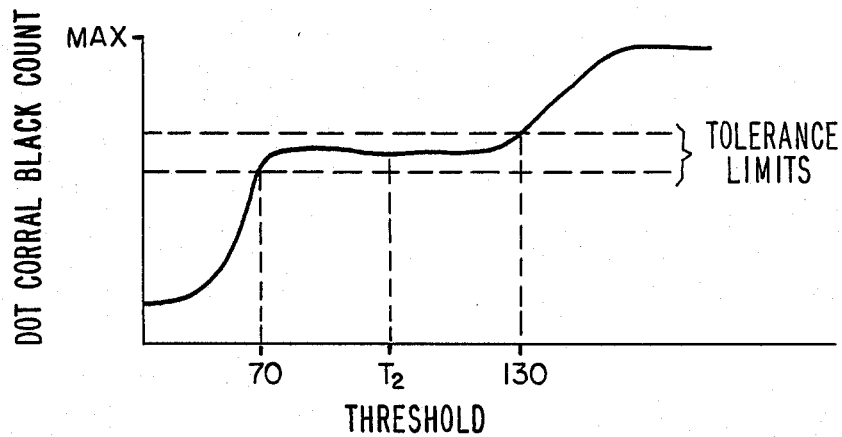
_Fig. 9e_

PATTERN RECOGNITION SYSTEM

RELATED APPLICATIONS

This application is related by subject matter to commonly assigned co-pending application bearing application Ser. No. 855,009 filed Apr. 22, 1986 now abandoned, which is incorporated herein by reference.

BACKGROUND OF THE INVENTION

This invention relates to apparatus and methods for determining the position and quality of a component held on a component holding means. More particularly, this invention relates to apparatus and methods for location of an integrated circuit chip, also known as a die, precisely with respect to the transfer means of a die bonding apparatus. The quality of a chip to be transferred by the die bonding apparatus is also determined.

In the production of electronic circuitry using computer assisted systems there is a need for extremely rapid and accurate placement of the chip or die on a substrate. In many applications a plurality of chips to be placed on the substrate are removably held upon an adhesive film prior to being placed on the substrate. Each chip must be removed or extracted from the film by the system and rapidly transferred to the substrate. In order to effect a proper transfer of the chip, it is necessary to precisely locate the chip relative to the tool or tools used to transfer the chip from the film to the substrate.

Rapid production of high quality chip/substrate assemblies using computer assisted systems also requires a precision apparatus which incorporates effective quality control features. For example, it is common that a certain percentage of the chips held upon the adhesive film are defective or of substandard quality. In many applications, the chips held on the adhesive film are inspected for defects prior to being placed upon the chip transfer apparatus. It is common in these situations to place a relatively dark dot on a chip which is identified by the computer assisted assembly system as being defective or of substandard quality. In order to maximize the overall efficiency of the bonding apparatus, it is desirable to bypass the chips which have been so marked, leaving them on the adhesive film and thereby minimizing the time spent producing defective chip/substrate assemblies. It is thus desirable to have a method and apparatus by which not only the location of the chip contained on an adhesive film is precisely determined but also the quality of that chip as well.

Due to the small size of modern electrical components, particularly semiconductor chips or dice, assembly of these components requires extreme precision and care. If an assembly process requiring this precision and care was carried out manually, i.e., by a human operator, the cost of production would be relatively expensive. In addition, the work would be so tedious so as to increase the likelihood of poor quality control. Accordingly, previous work in the field of the present invention has utilized computer assisted systems for locating and manipulating the tiny components. For example, see U.S. Pat. No. 4,441,205 - Berkin and U.S. application Ser. No. 735,839, filed May 20, 1985, now abandoned, both assigned to the assignee of this invention.

Accordingly, it is an object of the present invention to provide a pattern recognition system in which the location of the chip held on an adhesive film is precisely determined.

It is another object of this invention to provide a pattern recognition system by which a defective chip or die is rapidly identified.

It is a still further object of this invention to provide a pattern recognition system which operates automatically and without significant help from a human operator.

It is yet another object of this invention to provide an image processing system and method for a die bonding apparatus having an improved capacity over manual techniques.

It is another object of this invention to provide an image processing system and method which, by employing reflected light, is capable of distinguishing between a defect indicating dot and the dark areas of the die.

It is another object of this invention to provide an image processing system and method which accurately determines the edges of a die on a sawn wafer.

It is a still further object of this invention to provide an image processing system and method for a die bonding apparatus which is capable of accurately positioning a die with respect to the transfer tool of the die bonding apparatus.

SUMMARY OF THE INVENTION

These and other objects of the present invention are achieved by a system and method for determining the location and quality of a die on an adhesive film. The present invention can be described for illustrative purposes as generally comprising a video image generating system coupled to a video image processing system. The video image generating system establishes a video image of a candidate die and includes means for illuminating the candidate die and means for generating a video image in which the appearance of the candidate die is enhanced relative to the adhesive film holding the die. This is accomplished by providing a sensing means for sensing primarily only that light reflected from the candidate die. More particularly, the sensing means of this invention includes means for holding the candidate die in a plane which is not parallel to the adhesive film which holds and surrounds it. As a result, the film surrounding the die appears blacker than if the film was in the same plane as the die. In this way, the video image generating system of this invention provides a video image of the die in which the edges of the die are more easily identified by the video image processing system of this invention. The video image processing system of this invention comprises means for converting the video image into a digital image and processing said digital image to identify the edges of the die. More particularly, the image processing system of this invention comprises means for generating digital data representing the video image, means for defining a corridor in said digital image, said corridor having a width and a length, and means for processing said digital data to obtain the signature element within said digital data. A signature element is the widthwise summation of data within the corridor at point along the length of the corridor and represents the relative blackness or whiteness in a particular region of the die. Also provided is a means for analyzing the signature element so as to distinguish the surface of the candidate die from the surface of the holding means surrounding the die.

Another aspect of the video image processing system of this invention comprises means for determining the condition of a candidate die. In particular, means for generating an array of digitized data representing the video image and identifying the edges of the die in the digitized data representation is provided. Also provided is a control means for defining a corral within the digitized image of the die, means for obtaining a black count within the corral, and means for analyzing the black count to determine the condition of the die.

The present invention also includes a method for determining the position and condition of a candidate die held on an adhesive film. In carrying out the method of the present invention, the die is illuminated with light from a light source. Light is reflected from the die and digital data representing that reflected lighted is generated. The digital data is stored, and a corridor is defined within the digital data. The width of the corridor is defined so as to correspond approximately to one dimension of the die. A signature element, which is the widthwise summation of the data within the corridor at a point along the length of the corridor, is obtained. The signature element is then compared to a threshold signature element.

BRIEF DESCRIPTION OF THE DRAWING

The present invention will be more fully understood by reference to the accompanying drawing in which:

FIG. 9c is a graphical representation of the comparison of threshold level versus die size according to this invention;

FIG. 9d is a graphical representation of the comparison of light level versus plateau length according to this invention;

FIG. 9e is a graphical representation of the comparison of threshold level versus dot corral black count according to this invention;

DESCRIPTION OF THE PREFERRED EMBODIMENT

Figure 1:
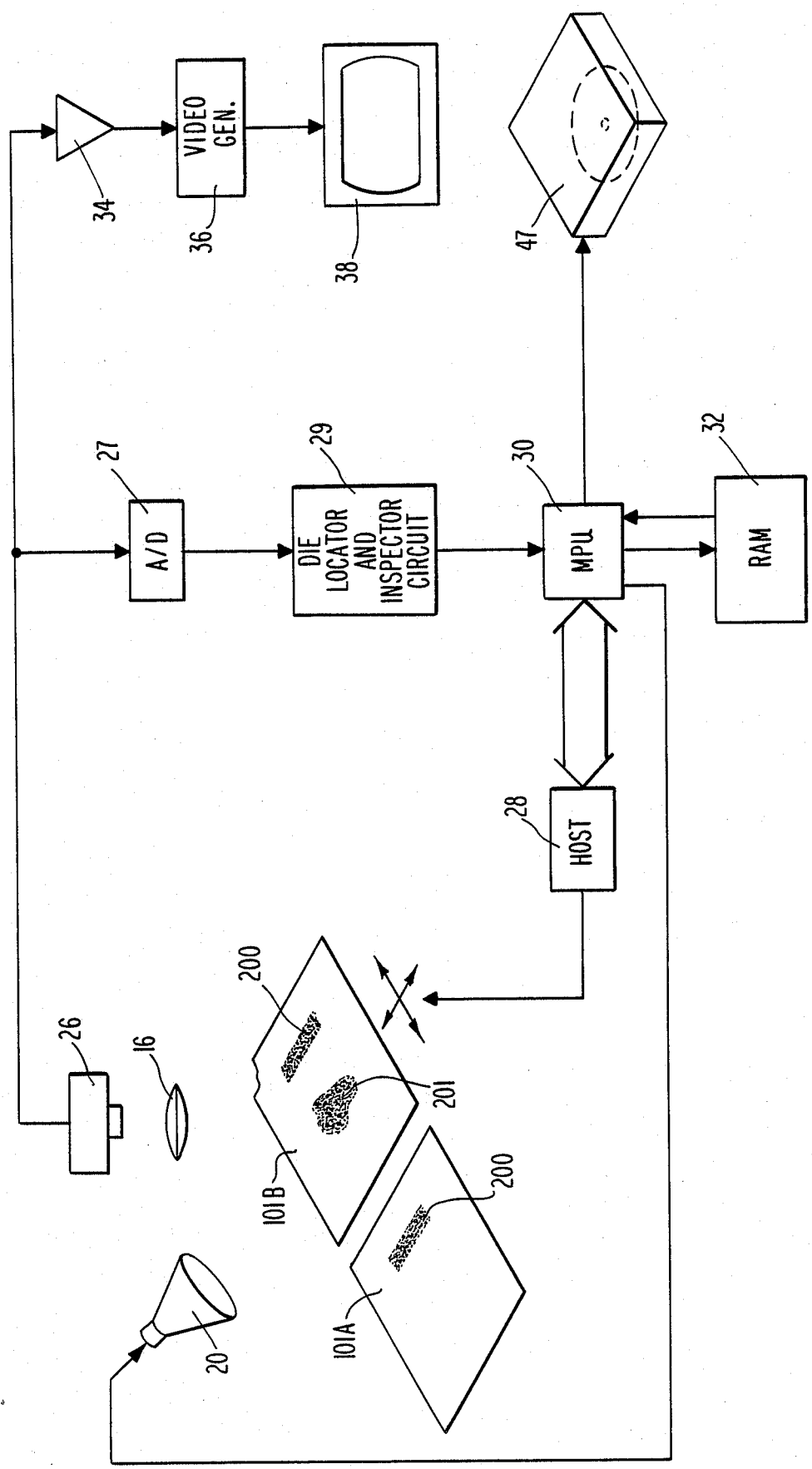
FIG. 1 is a schematic representation of the overall system of this invention, showing the video image generating system and the video image processing system of the present invention.

This invention is directed in general to a system and method for determining the condition and quality of an electrical component so that the component may be picked up and transferred as described below. FIG. 1 is a schematic representation of the overall pattern recognition system of the present invention. In order to most clearly disclose this invention, the overall system of this invention will first be described with reference to FIG. 1. Then the preferred environment in which this invention is used will be described. This will then be followed by a detailed description of the video image generating portion of this invention. And finally, the video image processing portion of the overall system will be described in detail.

THE OVERALL SYSTEM

FIG. 1 reveals a schematic view of an overall system for determining the location and condition of a die in a die bonding apparatus. In this figure, the video image generating portion of the overall system is shown schematically as light source 20, optics portion 16, camera 26, buffer amplifier 34, video generator 36, and monitor 38. The video image processing portion of the overall system is represented schematically as analog to digital converter 27, die locator and inspector circuit 29, microprocessor unit (MPU) 30, random access memory (RAM) 32, and auxiliary memory 47. It should be appreciated that categorizing the components of the pattern recognition system of this invention in this way is illustrative only and in no way affects the substance or scope of this invention. It should also be noted that host 28 has not been included in either the video generating category or the video processing category. This is because in the preferred embodiment host 28 acts primarily as a master with respect to the pattern recognition system of this invention, rather than in cooperation with it.

A plurality of dice are movable, under the control of host 28, in the orthogonal directions indicated by the arrows in FIG. 1. An important feature of this invention is the means for indicating to host 28 the precise location nd condition of the candidate die. The apparatus for generating the video image for use by the video image processing system comprises light source 20, optics 16, and light sensing means 26. In the preferred embodiment of this invention, light sensing means 26 may comprise a video tube, a videcon, a solid state sensor, or the like adapted to sweep in raster fashion over an area corresponding to the area viewed. A buffer amplifier 34 may also be provided to drive a video generator 36 which supplies a television screen 38 with a picture of what is viewed by the camera 26 to assist the human operator during the Teach operation, as will be outlined below. The analog signal output of camera 26 is converted in an analog to digital converter 27 to a digital representation, known as a "digital image", of the light intensity falling on the camera at corresponding locations in known fashion. In particular, the digital image comprises a two dimensional matrix of data. In order to establish the spatial orientation of the digital image, the matrix is divided into rows and columns. Each component element in the rows and columns of the matrix is known as a picture element or "pixel". The value of the pixel is representative of the light intensity or gray level corresponding to the actual image. This value is known as digital intensity. In the preferred embodiment of the present invention a 16 bit word providing 256 stages of digital light intensity is used, and the field of view is 240 by 240 pixels square.

The digitized samples from the A/D converter 27 are supplied to video die locator and inspector circuit 29. The output of the circuit 29 is supplied to the microprocessor unit 30 which is further coupled to random access memory means 32. The microprocessor 30 may also feed an auxiliary storage means such as a floppy disk or tape drive, shown schematically at 47, for storage of information generated according to the method of the invention as will be discussed in detail below.

Directing attention now to dice 101A and 101B of FIG. 1, the possible configuration of the dice will be described. As already mentioned, any given sawn wafer is likely to contain a percentage of defective or substandard dice along with high quality unblemished dice. Die 101A in FIG. 1 represents the condition of an unblemished, high quality die. It will be appreciated by those skilled in the art that dice of this type may have portions thereon which are darker in appearance than other portions, such as for example memory array 200 which is typically darker than the remainder of the die. If a die is found to be defective prior to placement of the sawn wafer upon the die bonding apparatus, this condition will generally be indicated by placing a dark ink dot on the die as indicated by 201 on die 101B. In addition, dice which are not dotted may nevertheless be chipped or cracked as revealed by the depiction of die 101B.

SYSTEM ENVIRONMENT

The Wafer and the Substrate

Figure 10A:
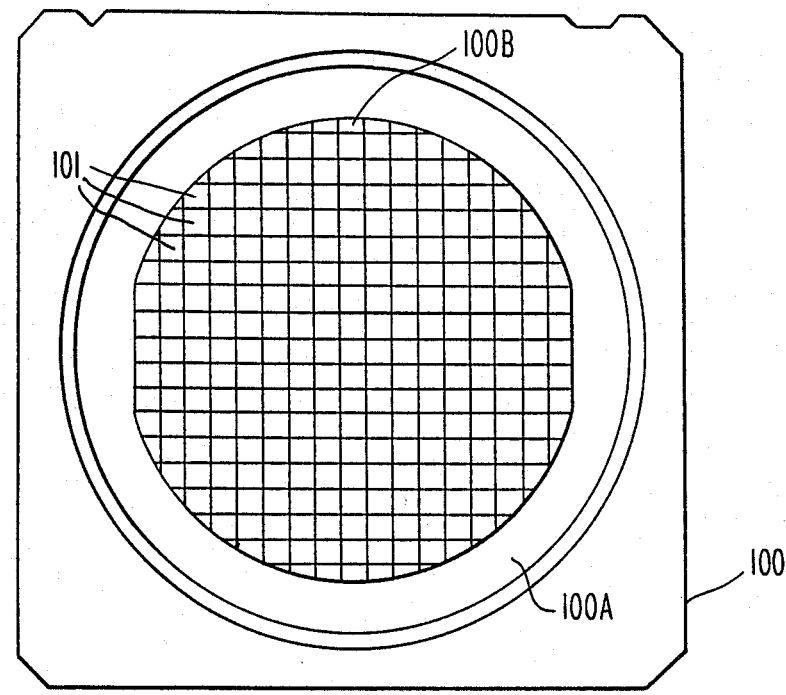
FIG. 10a is a plan view of the preferred holding means to be used with the pattern recognition system of this invention.
Figure 10B:
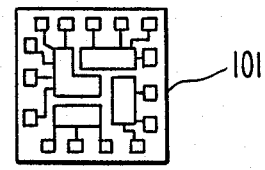
FIG. 10b is a detailed plan view of the die to be located by the pattern recognition system of this invention.
Figure 10C:
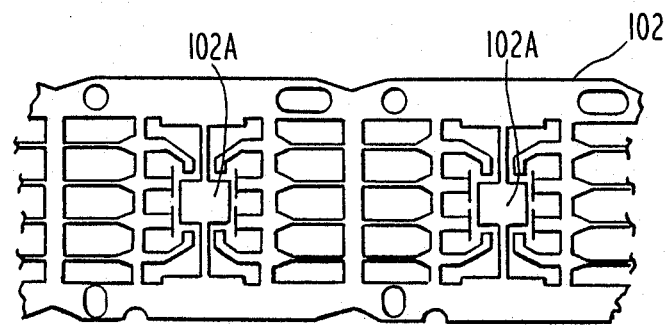
FIG. 10c is a detailed plan view of the leadframe or substrate to which the die is to be transferred according to the preferred embodiment of this invention.

The present invention relates to an apparatus and method for determining the position and condition of a component to be transferred from a component holding means to a substrate. This invention finds particular utility in the removal of a die 101 (FIG. 10b) from a sawn wafer 100B (FIG. 10a) and the transfer of that die to a bond site 102A of a semiconductor lead frame 102 (FIG. 10c). A plurality of dice comprise a sawn wafer 100B which is attached to an adhesive film 100A. The adhesive film 100A is in turn mounted to a metal or plastic frame 100. In the assembly of electronic components, the individual dice are removed from the adhesive film and placed precisely at the bond site 102A of the substrate 102.

The Die Bonding Apparatus

Figure 2:
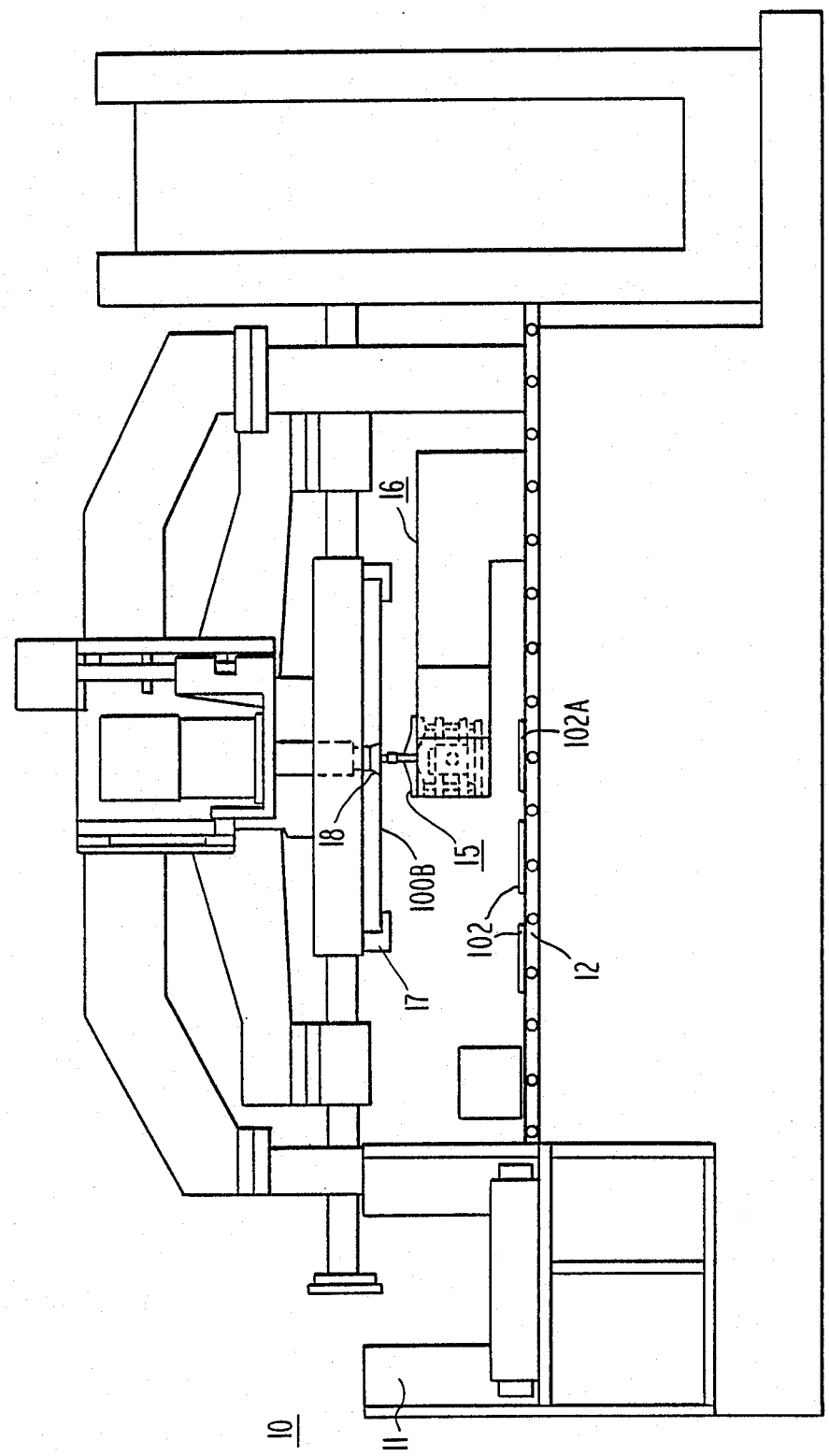
FIG. 2 is a front elevation view of the preferred die bonding apparatus to be used with the pattern recognition system of this invention.

The preferred apparatus to be used with pattern recognition system of this invention is disclosed in FIG. 2. It will be appreciated by those skilled in the art that the pattern recognition system of this invention may be readily adaptable for use with any die bonding apparatus, and the description of this invention with respect to the die bonding apparatus of FIG. 2 is for illustration and convenience only. The die bonding apparatus, generally designated as 10, contains substrate or lead frame holding tray 11 for holding a plurality of substrates 102. Each substrate 102 is moved along a track 12 until a bond site 102A is at a placement location in aligned registry below the die bond head, generally designated as 15. Sawn wafer 100B is held above die bond head 15 by XY table 17. As the term is used herein, an XY table refers to any means for holding a wafer frame in a given plane while having the capacity to move that wafer to various positions within the plane. In this way, each die 101 may be moved to a pickup location in aligned registry directly above the center of rotation of die bond head 15 and directly below die eject head 18.

As best revealed in FIG. 3, once die 101 is placed in a proper pickup location according to the pattern recognition system of this invention, as disclosed hereinafter, the die eject head 18 and die bond head 15 cooperate to remove the die 101 from the adhesive film 100B. Once the die 101 is removed, the die bond head 15 rotates 180° about its central axis to the position shown by the dotted lines in FIG. 3. Once in this position, die bond head 15 is actuated to place die 101 on substrate 102.

The mechanical operation of die bonding apparatus 10 is more fully and completely described in co-pending application Ser. No. 855,009 filed Apr. 22, 1986, now abandoned.

VIDEO IMAGE GENERATING SYSTEM

According to the preferred embodiment of this invention, a candidate die 101C to be removed from the adhesive film 100B is "bright field" illuminated. In order to maximize the efficiency of the pattern recognition system of this invention, it is desirable to illuminate the die with light that travels in a substantially perpendicular direction with respect to the plane of the die. Referring now to FIGS. 3 and 4, the preferred means for illuminating the candidate die 101C and the light sensing means for detecting light reflected from the candidate die is revealed. Referring now to FIG. 4, the illuminating means of this invention comprises a light source 20. In a preferred embodiment of this invention, the light source 20 is a variable source capable of producing different intensities of light. In the most preferred embodiment of this invention, light source 20 is capable of producing 256 distinct degrees of light intensity. As is well known in the art, lenses 21 and 22 are located so as to focus light from light source 20 onto a first mirror 23 as indicated by the arrows labeled L. In a preferred embodiment of this invention, the mirror 23 is a beam splitter which, accordingly to principles well known in the art, insures that light from the light source 20 is reflected primarily towards a second mirror 24 as further indicated by the arrows marked L.

Figure 3:
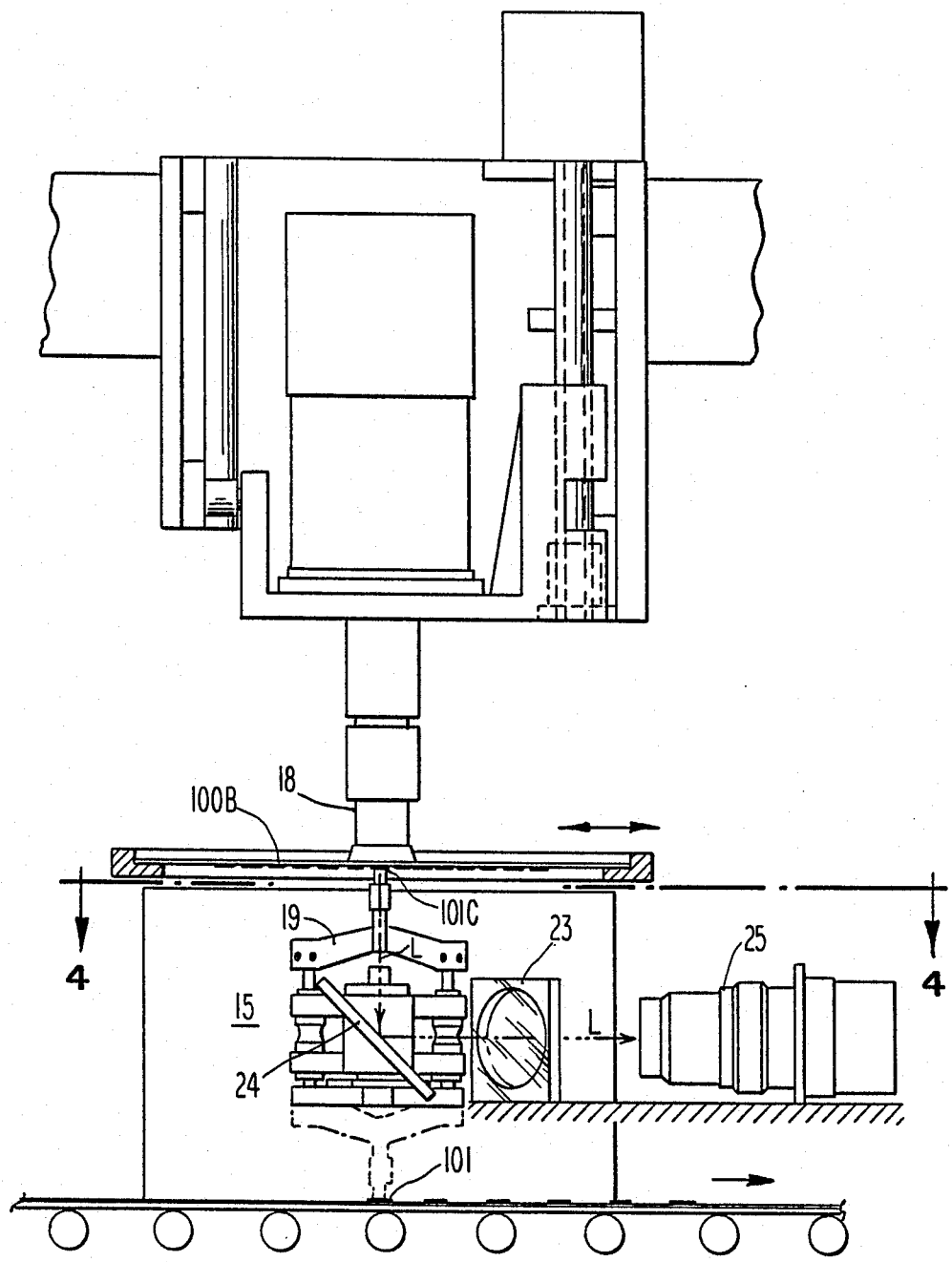
FIG. 3 is another front elevation of the preferred die bonding apparatus to be used with the pattern recognition system of this invention showing, in detail, that portion of the apparatus in which transfer of the die takes place.
Figure 4:
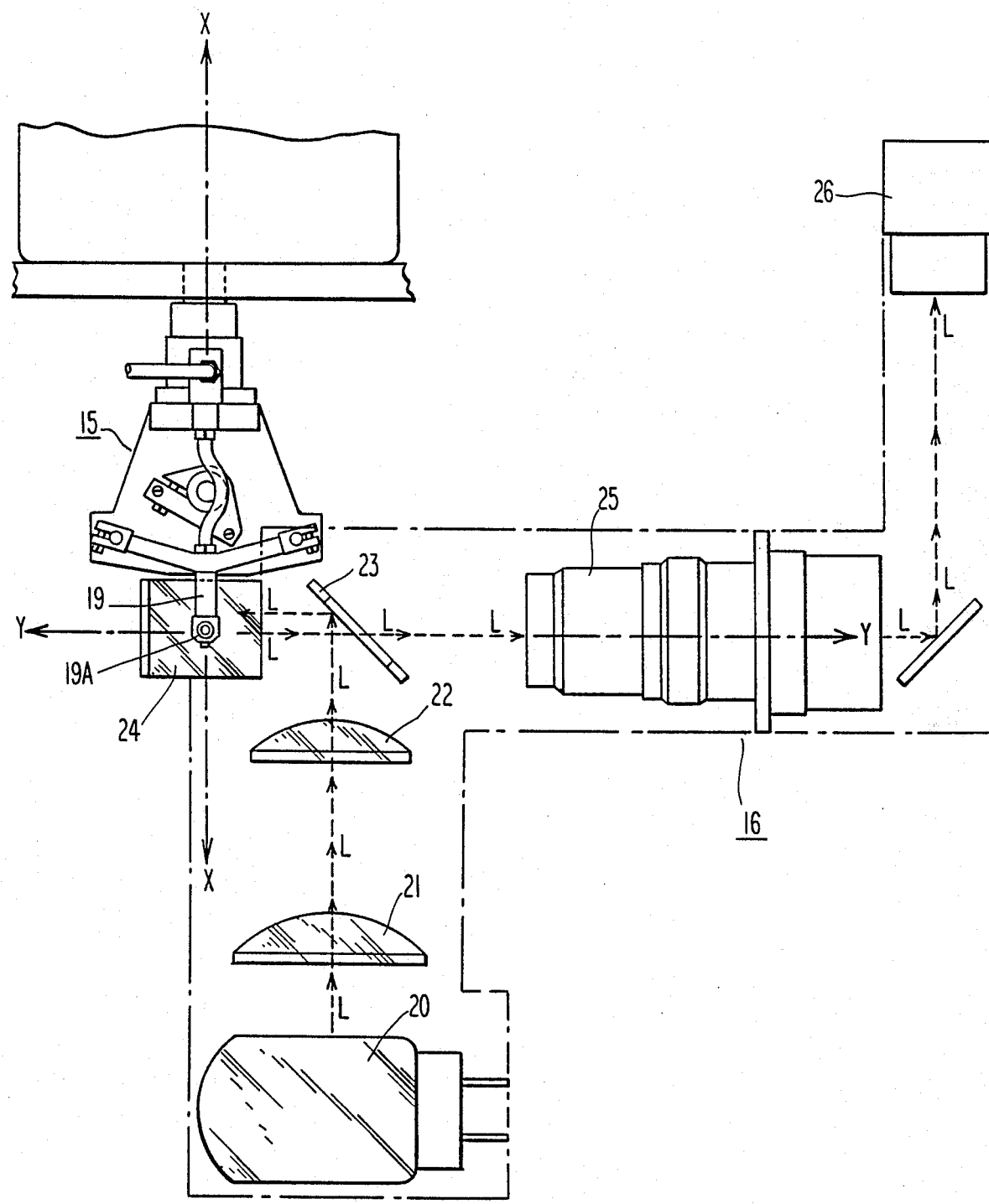
FIG. 4 is a cross sectional view of the die bonding apparatus of FIG. 3 taken along lines 4—4 of FIG. 3.

As best revealed in FIG. 3, the second mirror 24 sits at a 45° angle with respect to the plane of candidate die 101C. In this way, the apparatus of this invention insures that light from light source 20 illuminates the candidate die 101C predominantly from a direction perpendicular to the plane of the die, according to the preferred embodiments of this invention. As will be appreciated by those skilled in the art, light which illuminates the candidate die 101C is reflected back at an angle which is complimentary to the angle of incidence. Accordingly, in the preferred embodiment, light which illuminates the candidate die 101C is reflected back at an angle which is substantially perpendicular to the plane of the die. This light in turn impinges upon the second mirror 24 and is directed through the beam splitter 23, as also indicated by the arrows marked L in FIG. 3. Once light reflected from the illuminated die passes through beam splitter 23 it enters lens 25 whereupon it is focused for reception by a light sensing means, or more particularly camera 26. In the preferred embodiment of this invention, lens 25 is capable of magnifying the image of the die.

It will be appreciated by those skilled in the art that each point in the field of view of lens 25 corresponds to a particular point in the plane of the die. According to methods well known in the art, it is therefore possible to establish a relationship between the location of an object in the field of view of lens 25 and the actual location of that object. Accordingly, in a preferred embodiment of the invention, the center of the field of view of lens 25 corresponds to that point in the plane of the die directly above the center of the ace 19A of die tool 19 and directly below the center of die eject head 18.

Both FIG. 3 and FIG. 4 disclose die bond head 15 in a pickup position for removing a die from the adhesive film. It will be appreciated by those skilled in the art that the bonding tool 19 must be moved to a non-interfering position with respect to the path of the light in order for the optics portion of this invention to sense the position of candidate die 101C. This is accomplished by providing for rotation of die head 15 as fully disclosed in co-pending application Ser. No. 855,009 filed Apr. 22, 1986, now abandoned.

Figure 5:
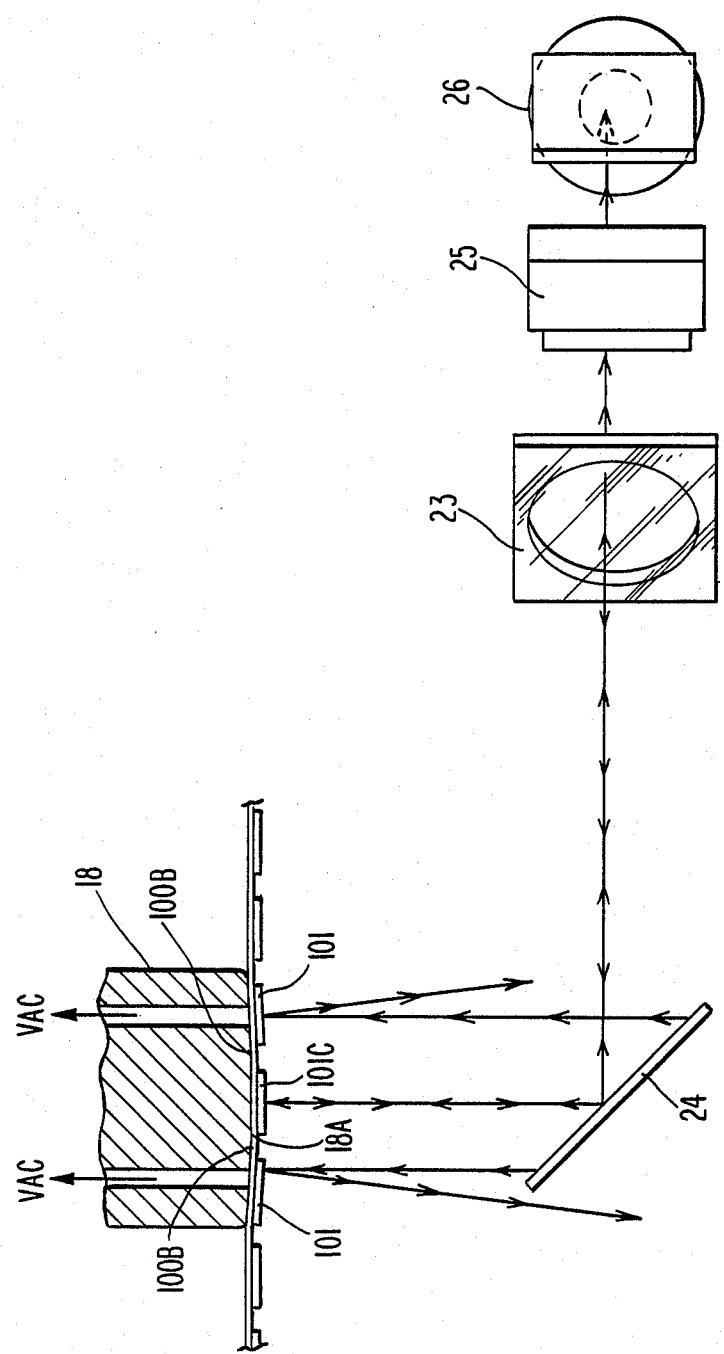
FIG. 5 is a schematic view showing the video image enhancing means of this invention.

An important feature of the present invention comprises means for providing an enhanced image of the candidate die 101C. As best revealed in FIG. 5, candidate die 101 is presented in a plane which is different from the planes of the surrounding film 100B and dice 101. This is achieved by conforming adhesive film 100B to the concave or angled lower surface 18A of the die eject head 18. In the preferred embodiment, the means for assuring this conformation comprises application of vacuum to the surface 18A of die eject head 18, as described more fully in co-pending application Ser. No. 855,009, now abandoned. In the preferred embodiment of this invention, the central region of surface 18A is substantially flat and holds candidate die 101C in a plane which is substantially perpendicular to the illuminating light as indicated by the arrowed lines shown in FIG. 5. The concave surface 18A of die head 18 insures that the surrounding film and dice are held at an angle with respect to the plane of the candidate die 101C. In this way, incident light which travels perpendicular to the plane of candidate die 101C but which impinges upon the surrounding film and dice will be reflected in a direction which is not perpendicular to candidate die. In this way, predominately only that light which strikes candidate die 101C will return in a perpendicular path to mirror 24 and thus be directed to lens 25. The image of candidate die 101C is thereby enhanced since the area surrounding film 100B and dice 101 will reflect relatively little light back to the light sensing means. As a result, the surrounding area appears blacker than if it was contained on the same plane as the candidate die 101C. It will be appreciated by those skilled in the art that the angle of inclination of the film with respect to the candidate die will be a function of many factors, including die size, die spacing, film flexibility, adhesive strength, and others. Variations in these parameters which result in the selection of differing angles of inclination are all within the scope of this invention. In a preferred embodiment of this invention, the angle of inclination of the area surrounding the candidate die with respect to the plane of the candidate die is approximately two and a half degrees. In this way, the adhesive film which holds the sawn wafer is not overly stressed while at the same time this angle provides sufficient deflection of the light to enhance the image of the candidate die 101C.

VIDEO IMAGE PROCESSING SYSTEM

As disclosed, this invention relates to a system and a method for ascertaining, at high speeds, the position and condition of electrical components. In particular, the video image processing system of this invention includes the steps of and means for generating, comparing, and storing digital data representations of the light reflected from the sawn wafer used with this invention. In order to achieve the high speeds desired, a computer is used as the preferred means for carrying out many of the steps. Accordingly, the method steps of this invention may be adapted for use with any computer hardware having the appropriate capacity and desired speed. In the preferred embodiment, a computer adapted for use according to this invention will provide the ability to operate in both a "Teach" mode and a "Find" mode. The Teach mode of this invention comprises those method steps which generate many of the values used according to the Find mode method of this invention. It should be clear that the Teach mode of this invention has utility independent of the Find mode and that the Find mode likewise has utility independent of the Teach mode. Accordingly, while the Teach and Find modes of this invention are advantageously used together in the preferred embodiment, separate sections of this specification are addressed to the Find and Teach modes, with comments directed to coordinated use where appropriate.

Die Location - FIND MODE

According to the video image processing portion of this invention, a candidate die is located by determining the edges of the die. It is important to the objects of this invention to insure that the edges of the die are properly located and that the dark areas of the die, such as memory arrays, chips, cracks, and dots are not mistaken for edges. In accomplishing this objective the video die locator and inspector circuit 29 may comprise hardware shown in FIG. 6 which follows the steps of the Find mode, described in connection with FIG. 7 below.

The first step in the Find mode of this invention is characterized generally (box 70 of FIG. 7) as binarizing the image and looking for die edges. The hardware of the circuit which is used in the preferred embodiment to carry out this step is described in connection with FIG. 6. Digital input from the analog to digital converter 27 is directed to comparators 40 and 41. In comparator 41, the digital data from analog to digital converter 27 is compared to a threshold value T1 supplied by MPU 30. In a preferred embodiment of this invention, the value of T1 is determined according the Teach operation of this invention and stored in RAM 32 or tape drive 47, as disclosed hereinafter. Comparators 40 and 41 are the means by which the digitized data from analog to digital converter 27 is binarized to a series of ones and zeros. In the preferred embodiment of this invention, a binarized value of zero indicates the digital equivalent of black while a binarized value of one indicates the digital equivalent of white. For example, if the digitized representation of light results in a pixel having a gray level of 100 and the threshold gray level T1 is 150, the binarized value VT1 of that pixel as it is reported by comparator 41 will be 0 since it falls below the threshold level. Accordingly, the binarized representation of that digital data will be the digital equivalent of black. Comparator 40 performs the same function as comparator 41 except that a different threshold level T2 is used, as is desirous according to a preferred embodiment of this invention discussed hereinafter. The binarized output VT1 from comparator 41 is directed to frame store RAM 42 and x and y signature generator 43. The binarized output VT2 from comparator 40 is directed to VT2 frame store ram 44. The x and y signature generator 43 generates signature elements by summing the values of the pixels in a given column or row within a corridor as disclosed hereinafter. The output from x and y signature generator 43 is then directed to edge finder 45 wherein the edges of the die are ascertained, represented by the values XB, XE, YB, YE, and directed to MPU 30.

Figure 9A:
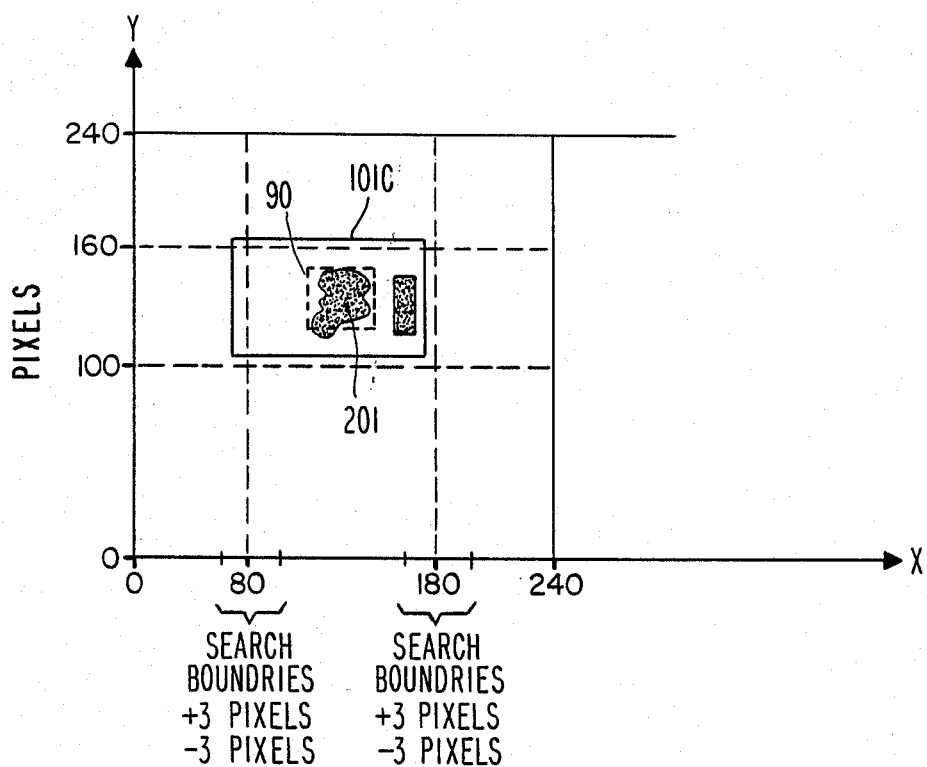
FIG. 9a is a graphical representation of a digital image of a candidate die and the corridors established in that digital image for locating the edges of the die.

More particularly, FIG. 9a represents the digital image of die 101B as viewed by camera 26. The digital field of view as disclosed in FIG. 9a is 240 by 240 pixels. For convenience of illustration, the rows of the data array as illustrated in FIG. 9a correspond to points along the y axis while the columns of the data array correspond to points along the x axis. For example, the designation of 80 on the x axis in FIG. 9a represents the location of the 80th column of pixels counted from the left boundary in the digital image. An x corridor and a y corridor are established in the digital image, preferably during the Teach mode as described hereinafter. These corridors correspond to the expected location and dimension of the candidate die to be selected. For example, the x corridor depicted in FIG. 9a extends from the 80th pixel column to the 180th pixel column along the x axis and the y corridor extends from the 100th pixel row to the 160th pixel row along the y axis. Accordingly, the y corridor is 60 pixels wide and 240 pixels long while the x corridor is 100 pixels wide and 240 pixels long. The rectangle formed by the intersection of the x and y corridors corresponds to the approximate expected size and location of the candidate die 101C. A search boundary is defined around each expected edge of the die. For example, as shown in FIG. 9a, a search boundary of 3 pixels to the right and 3 pixels to the left of the expected left edge of the die is established. It will be appreciated by those skilled in the art that the actual search boundary is selected based upon a wide variety of factors, including magnification of lens 25, actual die size, and others, and that the use of a search boundary of 3 pixels is illustrative only. Variation of the search boundary is accordingly within the scope of this invention. The left edge of the die is found by obtaining an x signature element at each point within the search boundary. As used herein, a signature element is defined as the widthwise summation of the binarized data within a designated corridor at a point along the axis parallel to the corridor. For example, an x signature element at a location within a die containing no dark spots, i.e. the gray level of each pixel is above the threshold level, would have a value of 60 if the top and bottom edges of the die fell exactly on the boundaries of the y corridor. This is so because each pixel would be binarized to a value of 1 within the y corridor, and since the y corridor is 60 pixels wide the signature element would have a value of 60. A y signature element within a die containing no dark spots would have a value of 100 if the left and right edges of the die fell exactly on the boundaries of the x corridor. On the other hand, at a point outside the actual edges of a die having no bright spots, i.e. no pixel has a gray value greater than the threshold level, the signature element will have a value of 0. According to this invention, the die edge is found when a signature element within the search boundary falls below the edge threshold value. In the preferred embodiment of this invention, the edge threshold value is equal to 65% of the corridor width. That is, using FIG. 9a for example, the y edge threshold value would be 65, and a y signature element of 65 or less would represent an edge of the die. It will be appreciated by those skilled in the art that the exact edge threshold value may be varied according to the dictates of the apparatus. In the preferred embodiment of this invention, the search for the die edge begins at the search boundary towards the center of the die. For example, in FIG. 9a the search for the left edge of the die begins by summing the pixels in the 83rd pixel column within the y corridor. Since this portion of the die contains no dark spots in FIG. 9a, the x signature element at this point is approximately 60. It will be noted, however, that the actual value of the signature element at this point will actually be less than 60 since the die is displaced slightly above the expected die location as represented by the y corridor. As a result, one or two pixels in the 83rd column within the y corridor will probably have a 0 value since they are outside the actual die. The value of the x signature element at the 83rd column is then compared to the selected edge threshold value. If the signature element value is greater than the edge threshold value, the signature element along the 82nd column of pixels is then obtained and compared to the edge threshold value. The x signature elements are sequentially obtained and compared in this way until a signature element having a value below the selected edge threshold value is obtained. The pixel column associated with this signature element is then deemed to be the digital representation of the actual left edge and is represented by the designation $X_B$ for X beginning as disclosed in FIG. 6. According to a preferred embodiment of this invention, it is required that a certain number of non-edge indicating signature elements are obtained before an actual edge can be found. In this way, it can be insured that a dark area of the die coincidental with the search boundary is not mistaken for a die edge. For example, referring to the right edge of the die revealed in FIG. 9a, a dark memory array is located near the edge. The left search boundary of the right edge passes through this memory array and it is likely that the x signature element at this point in the die would fall below the edge threshold value. Accordingly, a minimum number of signature elements having a value greater than the edge threshold value must be obtained before an edge is assumed to be located. In this way, the pattern recognition system of this invention will not mistake a dark portion of the die for an edge. In addition, this insures that at least some portion of the search boundary is within the die. In the preferred embodiment, 3 non-edge indicating signature elements are obtained before an actual edge can be located.

The method according to the present invention proceeds as outlined above until each edge of the die has been located. As indicated by decision box 71 in FIG. 7, if all four edges are not found, the die is reported to the host as not found, as indicated by operation box 73. If all four edges are found, the microprocessor unit of this invention compares the die size as found to the expected die size, which, in the preferred embodiment, is the die size taught during the Teach mode of this invention. This is represented in the flow chart of FIG. 7 as decision box 72. If the difference between the die size as found and the expected die size is greater than a preselected tolerance, a second search for the actual die edge is conducted. In this second search, special corrals are used. These corrals are 3 pixels wide by the expected die dimensions long. The special corral is located just outside all of the found edges. A white count is then obtained for the special corral. As the term is used herein, a corral is any two dimensional area within the digital image. A white count is the summation of all the binarized pixel values within the corral and is a measure of the overall whiteness in the corral. Accordingly, in a dimension where the size check failed, a white count for the special corral is obtained for both found edges. The edge with the lowest white count in its adjacent special corral will be considered the true edge. The edge opposite the true edge will have its search range narrowed to the size tolerance plus a predetermined number of pixels in each direction from its expected position based on the position of the true edge. A second attempt to find this edge is done, and if an edge is found in the narrowed range then another size check is done. If a proper size check is still not obtained, MPU 30 reports to the host 28 that no die within size tolerance has been found, as indicated by decision box 74 in FIG. 7. The host processor also receives the found die position as indicated by decision box 81.

Dot Inspection - FIND MODE

Figure 6:
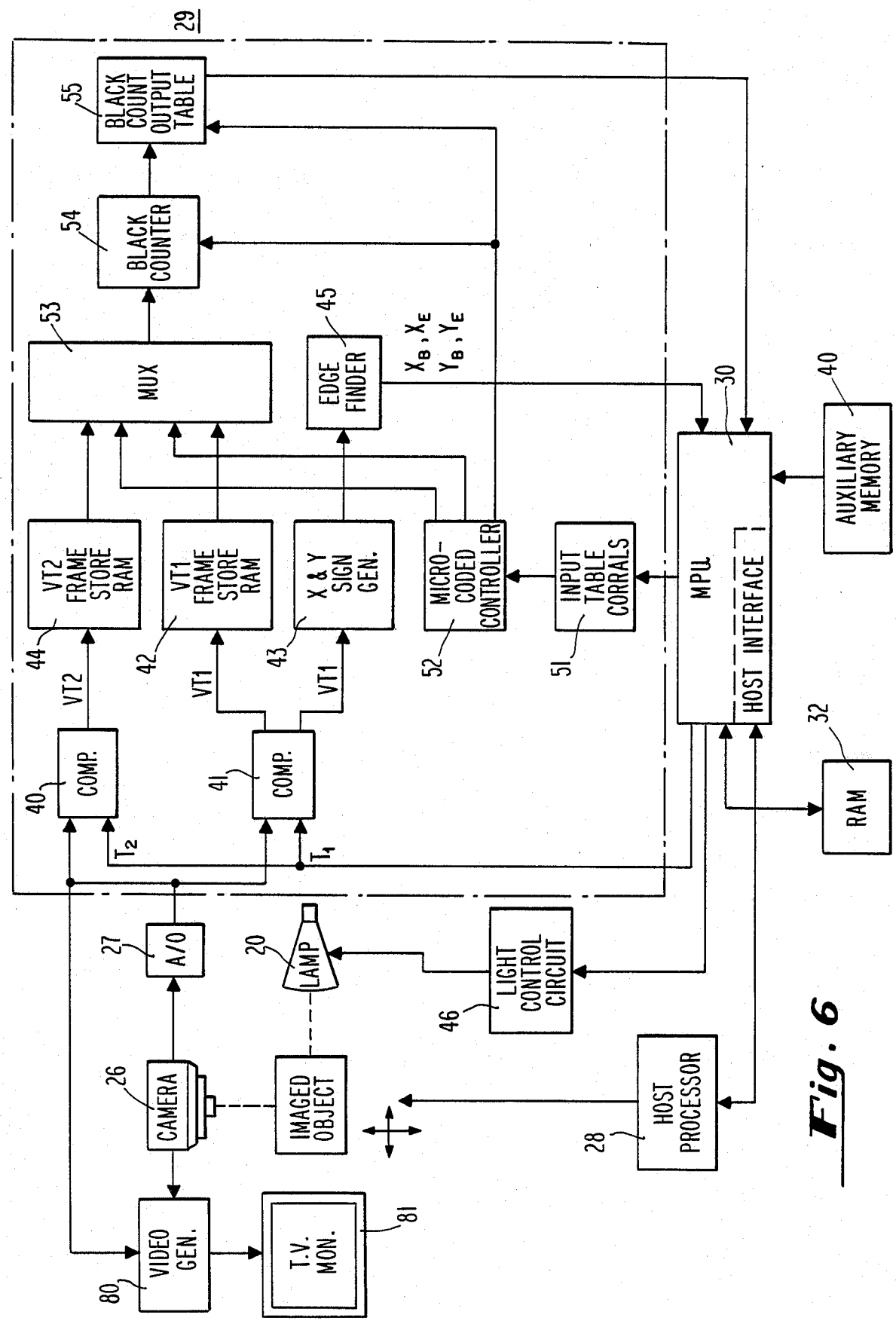
FIG. 6 is a more detailed block diagram of the system shown in FIG. 1.
Figure 7:
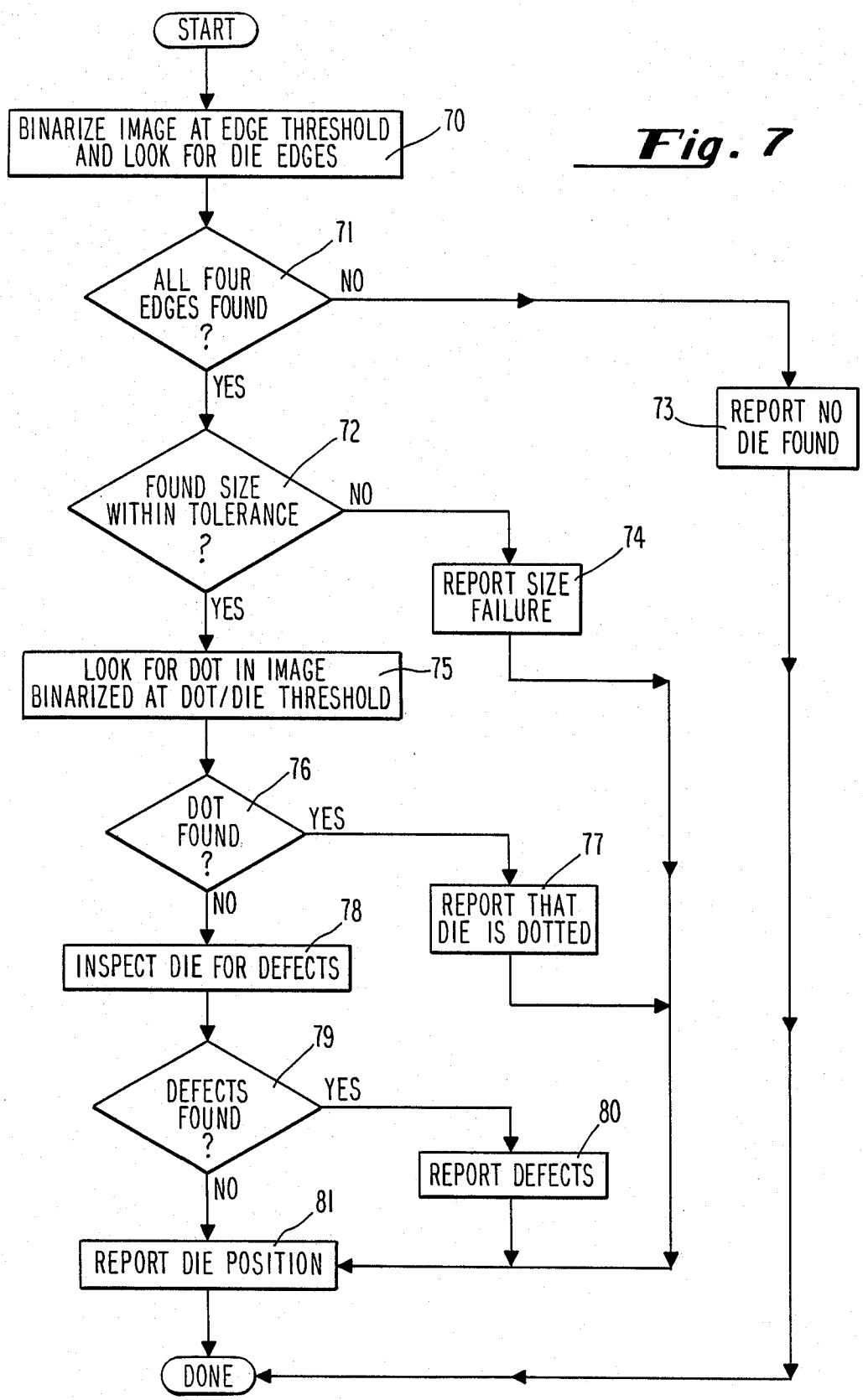
FIG. 7 is a flow chart illustrating the Find operation of the image processing system of this invention.

As indicated by decision box 75 in the flow chart of FIG. 7, once a die within size tolerance has been found, a search for a defect indicating dot is conducted. As already mentioned, the existence of a dark ink dot on a semiconductor chip or die is an indication that the die is defective in some manner. Accordingly, it is advantageous to recognize the existence of a dot so that the assembly of a defective electronic component can be avoided. Referring now to FIG. 6, MPU 30 of this invention delivers instructions to input table corral generator 51, which in turn establishes a dot corral having a predetermined size and position relative to the found die. In the preferred embodiment of this invention, the location and size of this dot corral is determined during the Teach mode of this invention and stored in RAM 32 or auxiliary memory 47, as disclosed hereinafter. In other embodiments, the size of the dot corral is established according to the expected dot size, while the location of the dot corral is centered within the found die. This information is directed through microcontroller 52 to multiplexer 53. Multiplexer 53 regulates the flow of information from VT2 frame store RAM, so that a black count within the dot corral can be established by black counter 54. As the term is used herein, a black count is the number of pixels in a given corral which have a binarized value of zero, thus being an indication of the blackness in a given corral. It will be appreciated by those skilled in the art that the black count is inversely related to the white count in a given corral. Accordingly, while the black count is used to refer to the blackness in a given corral, it also may be used to determine the whiteness. This is so because there is always a one to one correspondence between black count and white count. As a practical result, therefore, a black count can always be used to determine a white count and vice versa. For example, if 100 pixels are contained within a corral, a black count of 75 will always correspond to a white count of 25. Once obtained, the black count within the dot corral is passed through the black count output table and returned to MPU 30 where it is compared to a predetermined expected black count for the dot. In the preferred embodiment of this invention, the expected black count of the dot is established during the Teach mode and stored in RAM 32 or auxiliary memory 47, as disclosed hereinafter.

Referring once again to FIG. 9a, the digital representation of the dot corral is indicated by the dashed box 90 surrounding dot 201. In the preferred embodiment of this invention, box 90 is 40 by 40 pixels. As previously described, the digital intensity within this box has been binarized by comparator 40. Accordingly, the image within dot corral 90 is represented digitally by ones and zeros, wherein zero represents the digital equivalent of black and a one represents the digital equivalent of white. If the die is undotted and contains no other dark areas having an intensity less than the threshold level T2 within dot corral 90, each of the 160 pixels in the dot corral will have a value of 1. In this situation, dot corral 90 would have a black count of 0 since no pixel has a value of 0. On the other hand, if the digital intensity of each pixel within dot corral 90 is less than the threshold T2, each pixel would have a VT2 value of 0 and the black count within the dot corral would be 160, since each of the 160 pixels would have a value of 0. Accordingly, the existence of a dot is determined with reference to the black count within dot corral 90. In order for a dot to be found, it is necessary that the black count within the dot corral exceed a certain predetermined value. In the preferred embodiment of this invention, this value is determined according to Teach mode of this invention and stored in RAM 32 or in auxiliary memory 47. In the most preferred embodiment of this invention, a dot is considered found if the black count within the dot corral as determined in the Find mode exceeds 50% of the black count in the dot corral as determined during the Teach mode. If the black count within dot corral 90 exceeds the predetermined value, MPU 30 of this invention reports to the host 28 that a dotted die has been found, as indicated by decision box 76, operation box 77, and operation box 81 in the flow chart of FIG. 7.

Inspection for Die Defects - FIND MODE

Figure 9B:
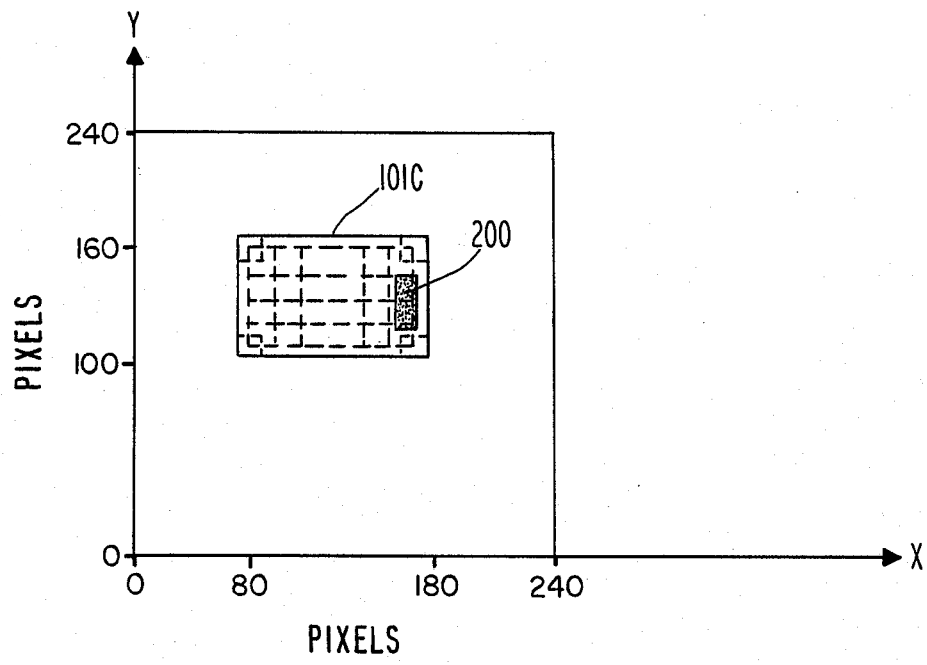
FIG. 9b is a graphical representation of a digital image of a die showing the corrals defined within that die.

If an undotted die is found, the method of this invention proceeds to inspect the die for defects as indicated by the operation box 78 in the flow chart of FIG. 7. The hardware used in accordance with this portion of the invention is essentially the same hardware described above with respect to the dot inspection hardware. Referring now to FIG. 9b the digital image of a die according to this portion of the invention is disclosed. The die edges and dimensions have been represented digitally as disclosed above and have been stored in RAM 32 or auxiliary memory 47. An array of inspection corrals are established within the digital representation of the die for the purpose of indicating defects in an undotted die. In general, the existence of a defect in the die will be indicated by an unusually high black count in any given corral. Establishing the corrals in the manner as set forth herein minimizes the possibility of mistaking a naturally occurring dark area of the die for a die defect. For example, for each corral disclosed in FIG. 9b, a maximum allowable corral black count is established. During inspection mode the actual black count in each corral is compared to this maximum allowable value. If the actual black count is greater than the maximum value, a defect is indicated. In the preferred embodiment of this invention, the location of each corral and its maximum allowable black count are determined according to the Teach mode of this invention, and both are stored in RAM 32 or auxiliary memory 47. In general, the maximum allowable black count for each corral corresponds to the black count of an unblemished die plus a safety margin. In this way, naturally occurring dark areas of die which reside in any given corral will not be mistaken for defects in the die. For example, memory array 202 in FIG. 9b is a naturally occurring dark area of an unblemished die. Accordingly, the maximum black count in the associated corrals will be correspondingly high. During inspection, therefore, only a black count which is higher than the black count expected for that particular corral plus some safety factor will be taken as an indication of a defect in the die. It will be appreciated by those skilled in the art that establishing corrals as disclosed herein not only greatly decreases the likelihood of mistaking a naturally occurring dark area of the die for a defect in the die, but also greatly increases the likelihood of properly identifying die defects. For example, a corral which encompasses an area of the die which has no naturally occurring dark areas will have a relatively low maximum black count. Accordingly, a small defect within this corral which may otherwise go undetected is easily identified according to the process and apparatus of this invention.

Referring once again to FIG. 6, the hardware utilized to perform the inspection mode of this invention is disclosed. Upon instructions from MPU 30, input table corral generator 51 establishes the size and location of the inspection corrals. Multiplexer 53 operates under instructions from the microcoded controller 52 to establish a black count in each corral using black count generator 54. This black count is established based upon binarized data as generated by comparator 41 using a threshold value of T1. The actual black count from each corral is then directed to black count output table 55 where the black count for each corral is directed to MPU 30. The black count in each corral is compared in MPU 30 to the maximum allowable black count for each corral as described above. If this comparison reveals that the die contains defects, the position of the defective die is reported to host 28 as revealed by decision box 79, operation box 80, and operation box 81 in the flow chart of FIG. 7. If no defects are found, the position of the non-defective die is reported to the host 28.

Light Level and Intensity Threshold - TEACH MODE

In the preferred embodiment, the Teach mode of this invention begins with a Teach box being generated by video generator 36 and displayed upon TV monitor 38, as shown in FIG. 6. The size of the Teach box generated by video generator 36 corresponds to the expected size of the die. Under manual control of the operator, the XY table of this invention is manipulated so as to move an unblemished die 101A into the field of view of camera 26. The operator then adjusts the position of the XY table so as to move unblemished die 101A to a position coinciding with the Teach box generated by the video generator. X and Y corridors and the associated search limits are then established in the digital image according to the boundaries of the Teach box. As disclosed earlier, in the preferred embodiment the search limit is increased by the required number of non-edges to the inside of the expected edge.

Figure 8:
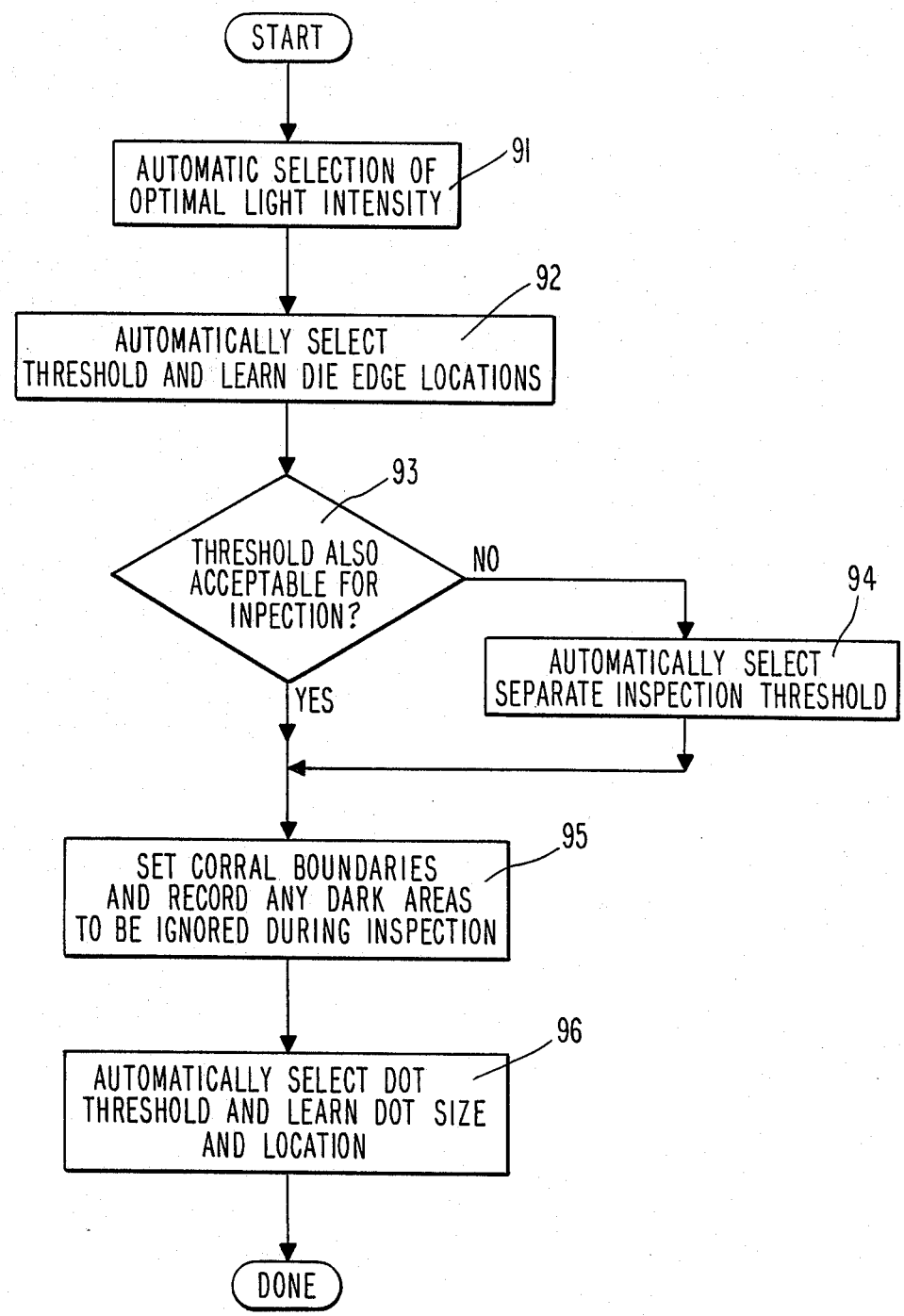
FIG. 8 is a flow chart illustrating the Teach operation of the image processing system of this invention.

Once the unblemished die 101A is manually positioned within the Teach box, the intensity setting of lamp 20 is determined as indicated by operation box 91 in the flow chart of FIG. 8. As revealed in the disclosure of the optics of this invention, light source 20 is a variable source capable of producing different levels of light intensity. In the most preferred embodiment of this invention, light source 20 is capable of producing 256 discrete increments of light intensity and is controlled by MPU 30 and light control circuit 46. This portion of the Teach mode will automatically select the optimum light intensity for light source 20.

Selection of the light intensity produced by light source 20 will now be described. Starting at a low level of light intensity from light source 20, a search is done for the die edges using the basic procedure outlined with regard to the Find mode. For example, in the preferred embodiment of this invention, the first search for the die edges is done at a relative light intensity of 70, wherein zero represents minimum intensity and 256 represents maximum intensity. As disclosed earlier, the value of T1 represents the threshold used for binarizing the data. The Teach mode begins by searching for a die edge with the light intensity from light source 20 set at a value of 70 and T1 set at a value of 1. With the light intensity and T1 accordingly set, a search for the die edges using the methods disclosed in the Find mode is carried out. That is, digital data from analog to digital converter 27 is compared to threshold value T1; in this example T1 equals 1. Accordingly, only those pixels having a digital intensity of zero will be assigned a VT1 value of zero, i.e. the digital equivalent of black. During the Teach mode, if no signature elements having a value less than the edge threshold value are found, the die edge is assumed to be the outer search boundary. Each edge of the candidate die is accordingly reported by edge finder 45 to MPU 30. Based upon the found edges of the die, the die size is determined by MPU 30 and stored in RAM 32 or auxiliary memory 47. With the light level at 70, the same procedure is performed for alternating values of T1. For example, the die size is determined for T1 at 3, 5, etc. Once the die size is determined and stored for alternating values of T1, a comparison of T1 versus die size for the light level at 70 is generated and stored. FIG. 9c is a graphic representation of this comparison. It will be observed from this graph that at very low levels of T1 the actual die edge is not likely to be found and the edges locations accordingly default to the location of the outer search boundaries. The die size which results is represented by the symbol MAX in FIG. 9c. As the threshold level T1 increase, the found die size approaches the expected or actual die size, notated by the symbol EXP in FIG. 9c. Eventually, T1 becomes so large as to cause the die edges to "appear" at the innermost search boundaries, as indicated by the symbol MIN in FIG. 9c. Based upon this comparison, a plateau length for that light intensity level is determined and stored. As the term is used herein, plateau length refers to the largest change in the threshold value over which (a) the die size remains constant within a plus or minus range, and (b) the size of the found die is within tolerance of the expected die size. For illustration purposes, the plateau length of FIG. 9c is 100 since between threshold levels of 100 and 200 the die size remains constant within the band designated as Tolerance Limit, and the size found for the die is within the tolerance for the expected size of the die as indicated by designation EXP. It should be noted that while in this example the plus or minus range for determining constant die size and the tolerance limit for the expected die size were the same, these two values will frequently be different.

Once the plateau length is determined with light source 20 set at an intensity level of 70, the intensity of the light is incremented upwards and a second comparison of die size versus T1 is obtained at the new light intensity value. In the preferred embodiment of this invention, the light intensity is incremented from 70 to 110 and a second comparison of die size versus T1 is obtained and recorded. In the preferred embodiment, this procedure continues in light intensity increments of 40 until a comparison at a light intensity of 230 is obtained and recorded. Using the information thus stored, a comparison of plateau length versus light intensity is obtained and recorded. This is represented in "smoothed" form by the graph shown in FIG. 9d. The peak in the graph as disclosed in FIG. 9d represents the optimum light level for the particular illustrated application. That is, for example, when light source 20 utilizes a light level of 120, the greatest plateau length is achieved. This is an indication of the optimum light level since it represents the light level at which an accurate determination of die size is the most independent of threshold value T1. Accordingly, the ability to determine the safest threshold value T1 for use in the Find mode is greatly enhanced. In a preferred embodiment of this invention, a "fine" search may also be conducted to even more precisely locate the optimum light level. In the most preferred embodiment, the fine search is done in increments of 10 starting from minus twenty relative to the best intensity found in the first search and proceeding to plus twenty relative to the best intensity found during the first search. A second comparison as in FIG. 9d is then generated and the optimum light level may be more precisely determined. In the preferred embodiment of this invention, if no light intensity level gives a plateau length of at least 20, then the light level is set manually.

Once the procedure described above for determining the optimum light level is completed, the optimum value of T1 is determined according to the Teach mode of this invention, as revealed by operation box 92 in the flow chart of FIG. 8. At the optimum light level, the range in T1 which defines the plateau at that light level is determined. The optimum value of T1 is set at 50% of the plateau length above the low end of the plateau. For example, if FIG. 9c represents plateau length versus die size for the optimum light level, the value of T1 used during the Find mode of this invention would be 150.

Die Edges, Inspection Corrals, and Black Counts - TEACH MODE

Using the same search limits and corridors described with regard to the Find mode above, each edge of the unblemished die is found when the respective signature element falls below the edge threshold after 3 non-edges have been found. In the preferred embodiment, as long as the edge is not found at the first or last search column or row it is considered a valid edge, and when four valid edges are found the edge positions are recorded and stored. In the preferred embodiment of this invention, the edge positions thus found define the expected location and dimensions of the die during the Find mode. Accordingly, the x and y corridors of the Find mode are established so as to be coincidental with the location and dimensions of the die as determined in the Teach mode.

Once four valid edges have been found during the Teach mode, the teach operation normally proceeds through the YES gate of decision box 93 and to the operation box 95 in the flow chart of FIG. 8. The digital representation of the unblemished die, within a margin inset from the taught die edges, is divided into inspection corrals, as revealed in FIG. 9b. The margin inset is provided to avoid including an area outside the die as part of a corral. It has been found, however, that a chipped or cracked die will often have these defects in the vicinity of a corner of the die. Accordingly, in the preferred embodiment of this invention, a corral is placed in each corner of the die as indicated in FIG. 9b so that the black counts in these regions are properly determined. By using the margin insets and corner corrals described above, the probability of misidentifying an edge of a candidate die as a die defect is reduced while the ability to properly identify a defective corner portion of the die is maintained. In the preferred embodiment, each corral is 20 pixels square. However, it will often be necessary that the center column and/or row of pixels is composed of pixels of a different size in order to compensate for die dimensions in which 20 by 20 pixels do not fit evenly, as disclosed in FIG. 9b. A black count for each corral, binarized at the optimum value of T1, is then obtained and stored. In this way, the digital representation of the blackness of substantially an entire unblemished die is acquired in discrete sections according to the corrals thus defined. Accordingly, each corral of an unblemished die will have a certain blackness which represents the natural darkness in that portion of the die. This naturally occurring darkness or "base black count" is the basis for establishing the maximum allowable black count used in the Find mode. In the preferred embodiment of this invention, the maximum allowable black count will be 120% of the base black count plus a predetermined inspection allowance. In the most preferred embodiment of this invention, the predetermined inspection allowance varies from 3% to 10% of the corral area. If any of the corrals have a base black count greater than 20, then the inspection percentage is doubled in the preferred embodiment of this invention to avoid false inspection failures when slight edge detection variation occurs.

On certain classes of die, it may be preferred to provide the step shown as operation box 94 in FIG. 8 in which a third threshold T3 is used with respect to the inspection corrals. This is done if the black count within any corral increases or decreases dramatically within 30 gray levels of the optimum value chosen for T1, as per decision box 93 in FIG. 8. If this situation exists, a special third threshold level T3 is established according to the center of the black count plateau. The term black count plateau is defined below with respect to the dot corral.

Dot Location and Dot Size - TEACH MODE

Once the steps of the Teach mode are performed on an unblemished die as described above, the operator moves a dotted but otherwise unblemished die 101B into the field of view of camera 26. The operator then manually adjusts the xy table of the die bonding apparatus until the dotted die is coincidental with the Teach box described earlier. Using the value of T1 and the light intensity selected according to the procedure described above, the edges of the dotted die are found and stored. An outer dot corral is then established within the digital image of the dotted die. Each edge of the outer dot corral is located 1/6 of the distance of the die dimension towards the center of the die. For example, if the found die is 60 pixels wide in the x dimension, the left edge of the outer dot corral will be 10 pixels to the right of the left edge of the die. Referring now to FIG. 6, the value of T2 represents a second threshold value used for obtaining a black count within the dot corral. Using the light intensity selected according to the method described above, a black count within the outer dot corral is obtained for every odd threshold level T2 between 0 and 255. This information is stored in MPU 30 and a comparison of dot corral black count versus threshold level T2 is generated, as depicted in FIG. 9e. The value of the outer dot corral black count at any given value of T2 will range from a minimum of 0 to a maximum equal to a completely dark outer dot corral. The largest change in T2 over which the black count remains constant, within a plus or minus tolerance, is then obtained. For illustration purposes, this black count plateau would exist in FIG. 9e between 70 and 130. In the most preferred embodiment of this invention, the tolerance limit for determining the outer dot corral black count plateau ranges from 125 to 300 depending upon the magnification of lens 25. The middle of the range of the black count plateau is obtained and is used as the value of T2 in the Find mode of this invention. In a preferred embodiment of this invention, if no black count plateau is longer than 10, then the value of T2 is set manually.

Figure 9F:
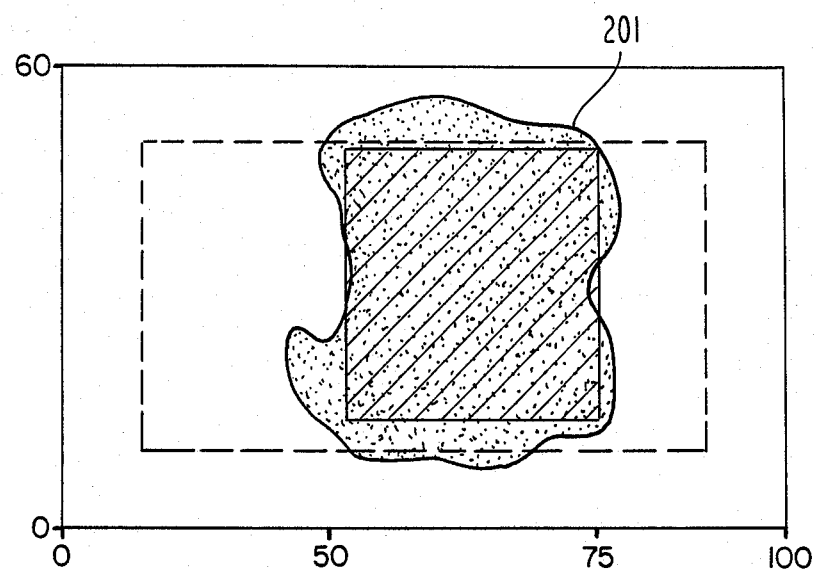
FIG. 9f and FIG. 9g are graphical representations of a digital image of a die showing the intersecting segments for locating a dot on a die according to this invention.
Figure 9G:
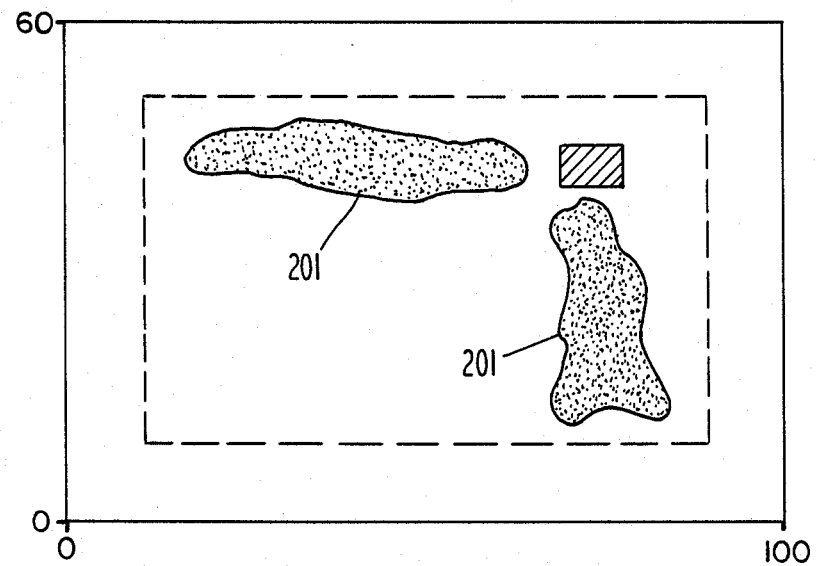

With the die edge positions already found according to methods described above and the value of T2 established, the next step of the Teach mode is to learn the location and size of dot 101B as revealed by operation box 96 in the flow chart of FIG. 8. The location and blackness of the dot obtained during this portion of the Teach mode is then used in the Find mode to determine whether or not a dotted die is presented. This portion of the Teach mode begins by examining the signature elements in each corridor beginning from 1/6 the found die size inside the edge positions of the die and obtaining the longest segment where the signature elements show enough black count to satisfy the minimum dot dimension. The minimum dot dimension is a predetermined value which is stored in RAM 32 or auxiliary memory 40. In the preferred embodiment of this invention this value varies from 2 to 11 according to the magnification used in the lens 25. For example, if a dot is assumed to be a minimum of 5 pixels wide in the x dimension, a y signature element within the outer dot corral showing a black count greater than 5 will satisfy the criteria. In the preferred embodiment of this invention, a gap of up to 3 pixel locations is allowed in determining the longest segment where the signature element shows enough black count to satisfy the minimum dot dimension. Once the segment for each axis has been determined, the intersection of these two segments is determined and a black count within the intersection, binarized at T2, is obtained. If the black count within this intersection is greater than 25% of the area of the intersection, then it is assumed that the dot is found centered at the middle of the intersection area. If the black count is less than 25% of the area then it is assumed that two separate dots or black areas were found and the dot location is defaulted to the center of the die. For example, referring to FIG. 9f, a die having a dimension of 100 pixels wide by 60 pixels high is illustrated. The dotted box within this rectangle represents the x and y corridor's set to 1/6 the die size within each die edge, i.e., the corridors correspond to the outer dot corral. The minimum dot dimension in the x axis is predetermined to have a value of 5 and the minimum dot dimension of the y axis is predetermined to have a value of 5. The intersection of the segments described above will correspond to the shaded area shown in FIG. 9f. It is clear, therefore, that the black count within the area of intersection will be greater than 25% of the area of intersection since essentially every point within the area of intersection represents a portion of the dot. Accordingly, the center of the area of intersection will closely approximate the center of the dot. On the other hand, referring to FIG. 9g, the situation in which a die has inadvertently received two separate dots is revealed. Accordingly, when the intersection of the segments is determined, an undotted portion of the die is all that is included within the shaded area. As a result, it is very likely that the black count within the shaded area of FIG. 9g will be less than 25% of the total intersection area. This relatively low black count is an indication that two separate black areas have been found and according to the Teach mode of this invention results in a default determination that the center of the dot will correspond to the center of the die. Once the center of the dot has been determined, a 40 by 40 pixel inner dot corral is centered on the center of the dot as located according to the method described above. A black count, binarized using the value of T2 described above, is obtained for the area within the inner dot corral. During the Find mode, an inner dot corral is placed at the same position relative to the die edges as that established during the Teach mode, and a dot will be considered found if the black count within the inner dot corral exceeds ½ of the black count in the inner dot corral during the Teach mode. It should be noted that in a few rare instances, a 40 by 40 pixel dot corral cannot be put inside the die due to the small dimensions of the die. In this case, the inner dot corral is never allowed to be closer than 5 pixels to any die edge.

It will be appreciated by those skilled in the art that many of the parameters discussed throughout this specification with respect to the digital image of a die will vary according to the magnification used by lens 25 in this invention. Accordingly, variation in any of the parameters discussed above is within the scope of this invention.

While particular embodiments of this invention have been shown and described, modifications are within the spirit and scope of this invention. The appended claims are intended to cover all such modifications.

What is claimed is;

1. A pattern recognition system for determining the position of a candidate die mounted on flexible die holding means comprising:
   (a) a light source for illuminating the candidate die;
   (b) means for presenting the candidate die such that the flexible die holding means surrounding said die is inclined at an angle greater than about zero degrees with respect to the plane of the candidate die;
   (c) means for sensing substantially only that light reflected at an angle of about 90° from the candidate die to provide a video image, whereby the image of the candidate die is enhanced with respect to the image of the die holding means;

(d) means for generating digital data representing said video image;

(e) memory means for storing said digital data in binary format;

(f) means for defining a corridor across said die in said digital data, said corridor having a width y and a length x;

(g) means for processing said digital data to obtain a signature element, said signature element being the widthwise summation of said y binary data within said corridor at a plurality of x points along the length of said corridor; and (h) means for analyzing said signature element to distinguish the surface of the candidate die from the surface of the holding means, whereby the position of said candidate die is determined within said corridor.

2. The system as described in claim 1 wherein said means for generating said digital data comprises means for generating a digital data array comprising orthogonal rows and columns of individual pixels, each pixel having a value representative of the intensity of said reflected light.

3. The system as described in claim 2 further comprising means for binarizing said digital data.

4. The system as described in claim 3 wherein said means for defining said corridor comprises means for determining an expected dimension of the candidate die and defining a pair of said columns or rows of said binarized data spaced apart by said expected dimension.

5. The system of claim 1 wherein said means for analyzing comprises means for comparing the value of said signature element to a threshold signature element value.

6. The system of claim 5 wherein said threshold signature element value is approximately 65% of the width of said corridor.

7. The system as described in claim 5 further comprising control means for sequencing the operation of said processing means and said analyzing means so as to obtain a signature element value less than said threshold signature element value and thereby identify an edge of the candidate die.

8. The system as described in claim 7 wherein said control means sequence said operation so as to identify two parallel edges of said die, and further comprising means for analyzing said identified edges to determine a dimension of said die.

9. A pattern recognition system for determining the position of a candidate die on an adhesive film comprising:

(a) a light source for illuminating the candidate die;

(b) means for presenting the candidate die such that the adhesive film surrounding said die is inclined at an angle greater than about a zero degrees with respect to the plane of the candidate die;

(c) means for sensing primarily only that light reflected from the candidate die at a first angle with respect to the plane of the candidate die;

(d) means for generating a digital image of said reflected light, said digital image being comprised of a two dimensional array of orthogonal rows and columns, the component element of the rows and columns being a pixel, each pixel having one value in a range of a values representing the digital intensity of the corresponding portion of said digital image, said range of values comprising more than two values;

(e) memory means for storing said digital image;

(f) means for defining an y corridor in said digital image, said y corridor having a width in pixel rows equal to about the expected y dimension of said candidate die and a location coinciding with the approximate expected location of said candidate die;

(g) means for binarizing aid digital image such that each of said pixels has a value of either 1 or 0;

(h) means for outlining an x signature element of said binarized data, said x signature being the summation of a column of pixel values within the y corridor;

(i) means for obtaining an x edge threshold value representative of the minimum expected x signature element value within the digital image of the candidate die; and (j) means for indicating whether said signature element is within or without the digital image of said candidate die by comparing said x signature element to said x edge threshold value.

10. The pattern recognition system of claim 9 further (a) means for defining an x corridor in said digital image, said x corridor having a width in pixel columns equal to the expected x dimension of said candidate die and a location coinciding with the approximate expected location of said candidate die;

(b) means for obtaining a y signature element of said binarized data, said y signature element being the summation of a row of the pixel values within the x corridor; and (c) means for comparing said y signature element to a y edge threshold value, where said y edge threshold value represents the minimum expected y signature element value within the digital image of the candidate die.

11. The pattern recognition system of claim 10 further comprising control means for sequencing the operation of said x signature element obtaining means, said y signature element obtaining means, said x signature element comparing means, and said y signature element comparing means so as to obtain two x signature elements having a value less than said x edge threshold value and two y signature elements having a value less than said y edge threshold value, and thereby identify the dimensions and location of said candidate die.

12. The pattern recognition system of claim 9 wherein means for sensing comprises means for sensing primarily only that light reflected from the candidate die.

13. A method of determining the position and condition of a candidate die held on an adhesive film with respect to a die transfer tool comprising:

(a) illuminating the candidate die with light from a light source;

(b) presenting the canditate die such that the adhesive film surrounding said die is inclined at an angle greater than zero degrees with respect to the plane of the candidate die;

(c) sensing primarily only that light reflected from the candidate die at a first angle with respect to the plane of the candidate die;

(d) generating digital data representing said reflected light;

(e) storing said digital data in a memory;

(f) defining a y corridor in said memory, said y corridor having a width equal to about the y dimension of the candidate die;

(g) defining an x corridor in said memory, said x corridor having a width equal to about the x dimension of the candidate die;

(h) obtaining an x signature element, said x signature element being the widthwise summation of said data at a point within aids y corridor;

(i) obtaining a y signature element, said y signature element being the widthwise summation of said data at a point within said x corridor; and (j) comparing the value of said y signature element or said x signature element to a threshold signature element value.

14. The method of claim 13, wherein said digital data comprises a data array of orthogonal rows and columns of individual pixels, each pixel having a digital value representative of the intensity of said reflected light.

15. The method as described in claim 14 further comprising the step of binarizing said digital data prior to the first obtaining step.

16. The method of claim 15 wherein said y corridor defining step comprises determining the expected y dimension of the candidate die and defining a pair of said rows of said binarized data spaced apart by said expected dimension and wherein said x corridor defining step comprises determining the expected x dimension of the candidate die and defining a pair of said columns of said binarized data spaced apart by said expected dimensions.

17. The method as defined in claim 13 wherein said threshold signature element value is approximately 65% of the corridor width.

18. The method as defined in claim 17, further comprising repeating said x or y obtaining step and said comparing step until the value of said y signature element or said x signature element is less than said threshold signature element value.

19. The method as defined in claim 18 further comprising controlling said repeating step so as to identify two parallel edges of said die.

* * * * *

UNITED STATES PATENT AND TRADEMARK OFFICE
CERTIFICATE OF CORRECTION

PATENT NO. : 4,823,394

DATED : Apr. 18, 1989

INVENTOR(S) : George Berkin, et al.

It is certified that error appears in the above-identified patent and that said Letters Patent is hereby corrected as shown below:

Column 4, line 56, "nd" should read --and--.

Column 19, line 47, "sequence" should read --sequences--; column 19, line 57 "a" should be deleted.

Column 20, line 10, "aid" should read --said--.

Signed and Sealed this

Sixteenth Day of January, 1990

*Attest:*

JEFFREY M. SAMUELS

*Attesting Officer*     *Acting Commissioner of Patents and Trademarks*